US010615969B1

(12) United States Patent
Griffin et al.

(10) Patent No.: US 10,615,969 B1
(45) Date of Patent: Apr. 7, 2020

(54) DATABASE ENCRYPTION KEY MANAGEMENT

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 206 days.

(21) Appl. No.: 15/811,789

(22) Filed: Nov. 14, 2017

Related U.S. Application Data

(60) Provisional application No. 62/457,707, filed on Feb. 10, 2017.

(51) Int. Cl.
*H04L 9/08* (2006.01)
*H04L 9/06* (2006.01)

(52) U.S. Cl.
CPC .......... *H04L 9/0825* (2013.01); *H04L 9/0643* (2013.01); *H04L 9/0822* (2013.01); *H04L 9/0877* (2013.01); *H04L 9/0894* (2013.01)

(58) Field of Classification Search
CPC ... H04L 9/0822; H04L 9/0877; H04L 9/0869; H04L 9/0825; H04L 9/0643; H04L 9/0894

See application file for complete search history.

(56) References Cited

U.S. PATENT DOCUMENTS 6,996,722 B1 * 2/2006 Fairman .................. G06F 21/10
380/239
7,797,342 B2 9/2010 Banks et al.
7,885,413 B2 2/2011 Vasic et al.
(Continued)

*Primary Examiner* — Daniel B Potratz
*Assistant Examiner* — Vu V Tran
(74) *Attorney, Agent, or Firm* — Foley & Lardner LLP

(57) ABSTRACT

Methods and systems are described for enhanced-security database encryption via cryptographic software, where key management is carried out, without exporting or exposing cleartext keys, using an independent key manager coupled to a cryptographic hardware security module (HSM). A database encryption key management system is part of an HSM. A key manager circuit of the database encryption key management system generates a master key encryption key and stores it in the HSM. The key manager circuit generates an HMAC key and encrypts the HMAC key using the master key encryption key to generate a HMAC key cryptogram. The interface circuit of the database encryption key management system transmits the HMAC key cryptogram to a database server, which independently generates and stores a unique identifier. The HSM deletes the HMAC key from its storage media. The key manager circuit receives the HMAC key cryptogram and the unique identifier, decrypts the HMAC key cryptogram to obtain the HMAC key and, based at least on the HMAC key and the unique identifier, generates an HMAC. The interface circuit transmits the HMAC to the database server, which derives a database encryption key (DEK) using the HMAC as an input to a key derivation algorithm. The database encryption key resides in volatile memory of the database server. The master key encryption key resides within the HSM.

42 Claims, 9 Drawing Sheets

(56) References Cited

U.S. PATENT DOCUMENTS

| | | |
|---|---|---|
| 8,340,299 B2 | 12/2012 | Buer et al. |
| 8,638,934 B2 | 1/2014 | Deaver et al. |
| 8,750,516 B2 | 6/2014 | Goodman et al. |
| 8,813,247 B1 | 8/2014 | Alten |
| 8,966,281 B1 | 2/2015 | Raizen et al. |
| 9,137,658 B2 | 9/2015 | Kawamura et al. |
| 9,158,933 B2 | 10/2015 | Banks et al. |
| 9,288,044 B2 | 3/2016 | Spalka et al. |
| 9,432,346 B2 | 8/2016 | Madden |
| 9,660,970 B1 * | 5/2017 | Rubin .................. H04L 63/062 |
| 2013/0145160 A1 * | 6/2013 | Bursell ............... G06F 21/6218 713/168 |
| 2014/0087691 A1 | 3/2014 | Babbage et al. |
| 2015/0026456 A1 | 1/2015 | Kim et al. |
| 2015/0304315 A1 | 10/2015 | Esteghari et al. |
| 2017/0220624 A1 * | 8/2017 | Gokavarapu ....... G06F 16/2365 |
| 2018/0082283 A1 * | 3/2018 | Sharma .............. G06Q 20/3274 |

* cited by examiner

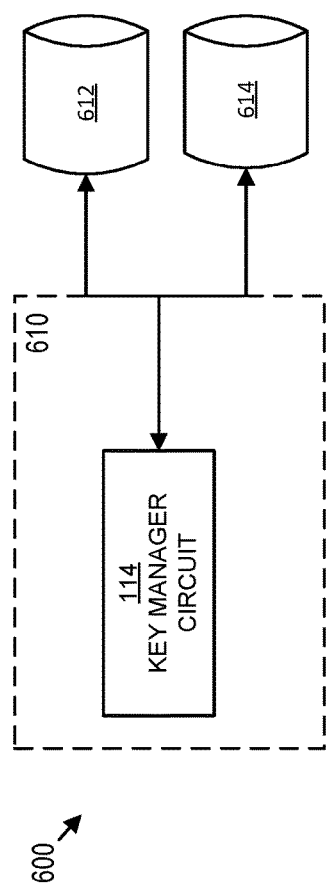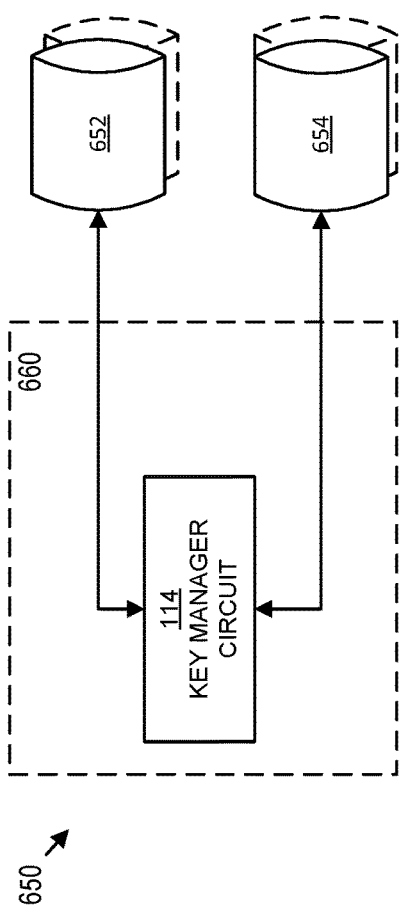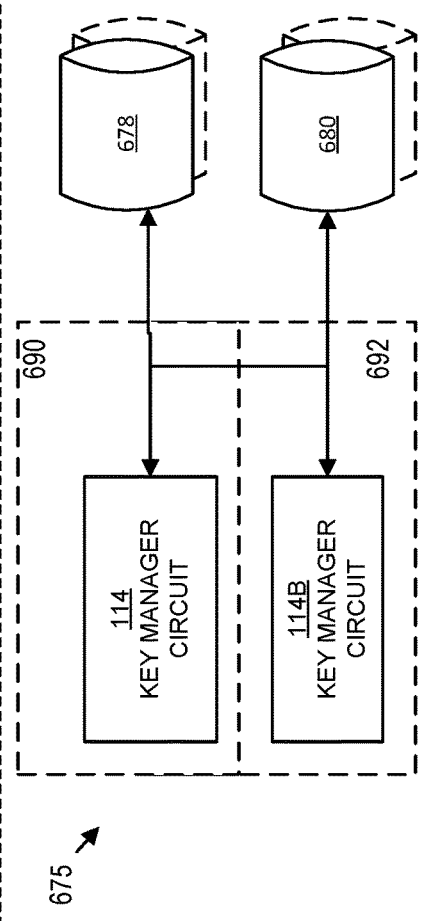

DATABASE ENCRYPTION KEY MANAGEMENT

CROSS-REFERENCE TO RELATED APPLICATION

The present application claims priority to U.S. Patent Application No. 62/457,707, filed on Feb. 10, 2017, the contents of which are incorporated herein by reference.

TECHNICAL FIELD

The present application relates generally to systems and methods for database encryption key management (DBEKM), including systems and methods for database encryption secure key management (DBESKM).

BACKGROUND

Database encryption technologies protect files, tables, columns, rows, or individual cells within a database. Sensitive information (e.g., credit card numbers, social security numbers and other sensitive or personally identifiable information) is encrypted to prevent access by unauthorized entities. Data encryption is typically performed using cryptographic software modules but the cryptographic keys are better protected using cryptographic hardware modules, also known as hardware security modules (HSM). A hardware security module (HSM) is a physical computing device that safeguards and manages cryptographic keys used for cryptographic functions (e.g., data encryption, key encryption, message authentication codes, or digital signatures within the cryptographic boundary of the HSM). An HSM may be implemented in the form of a channel plug-in card, an external cabled device, or an external networked device that communicates securely to a computer or network server.

SUMMARY

Various embodiments relate to a method performed by a processor of a database encryption key management (DBEKM) system. In some embodiments, the method relates to managing database encryption keys (DEKs) without exporting or transmitting cleartext keys. An HSM key manager circuit of a database encryption key management system associated with a hardware security module (HSM) generates a master key encryption key for the HSM. The HSM key manager circuit generates an HMAC key. The HSM key manager circuit encrypts the HMAC key using the master key encryption key to generate an HMAC key cryptogram. The HSM interface circuit transmits the HMAC key cryptogram to a database server. The HSM key manager circuit destroys the HMAC key and the HMAC key cryptogram from a storage media associated with the HSM. The database server stores the HMAC key cryptogram. The HSM interface circuit receives, from the database server, the HMAC key cryptogram and a unique identifier generated by the database server. The HSM key manager circuit decrypts the HMAC key cryptogram to obtain the HMAC key. The HSM key manager circuit generates a seed using the HMAC key and the unique identifier and deletes the unique identifier from the local storage media associated with the HSM. The HSM key manager circuit transmits the seed from the HSM to the database server. The database server derives a database encryption key (DEK) using the seed as an input to a key derivation algorithm (KDF). Advantageously, the DEK resides (is written to) only in volatile memory of the database server and the DEK is not stored, transmitted or exposed to auxiliary systems in cleartext format. The master key encryption key (MK) resides within the HSM, which is managed by the key manager circuit. The HMAC key cryptogram resides in database server storage along with the cleartext unique ID. Data (e.g. files, tables, columns, rows, or individual cells) may be encrypted and decrypted by the database server using the symmetric DEK used only in memory. In some embodiments, multiple HSMs per database server are used such that, for example, subsets of data stored on the database server may be encrypted using separate HSMs.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6A is a diagram of a system for managing an HMAC in a configuration with multiple database servers, providing an additional level of security with different HMAC keys across multiple databases.

FIG. 6B is a diagram of a system for managing an HMAC in a configuration with multiple database servers, providing an additional level of security with multiple master key encryption keys per HSM.

FIG. 6C is a is diagram of a system for managing an HMAC in a configuration with multiple database servers, providing an additional level of security with multiple HSMs.

Figure 1:
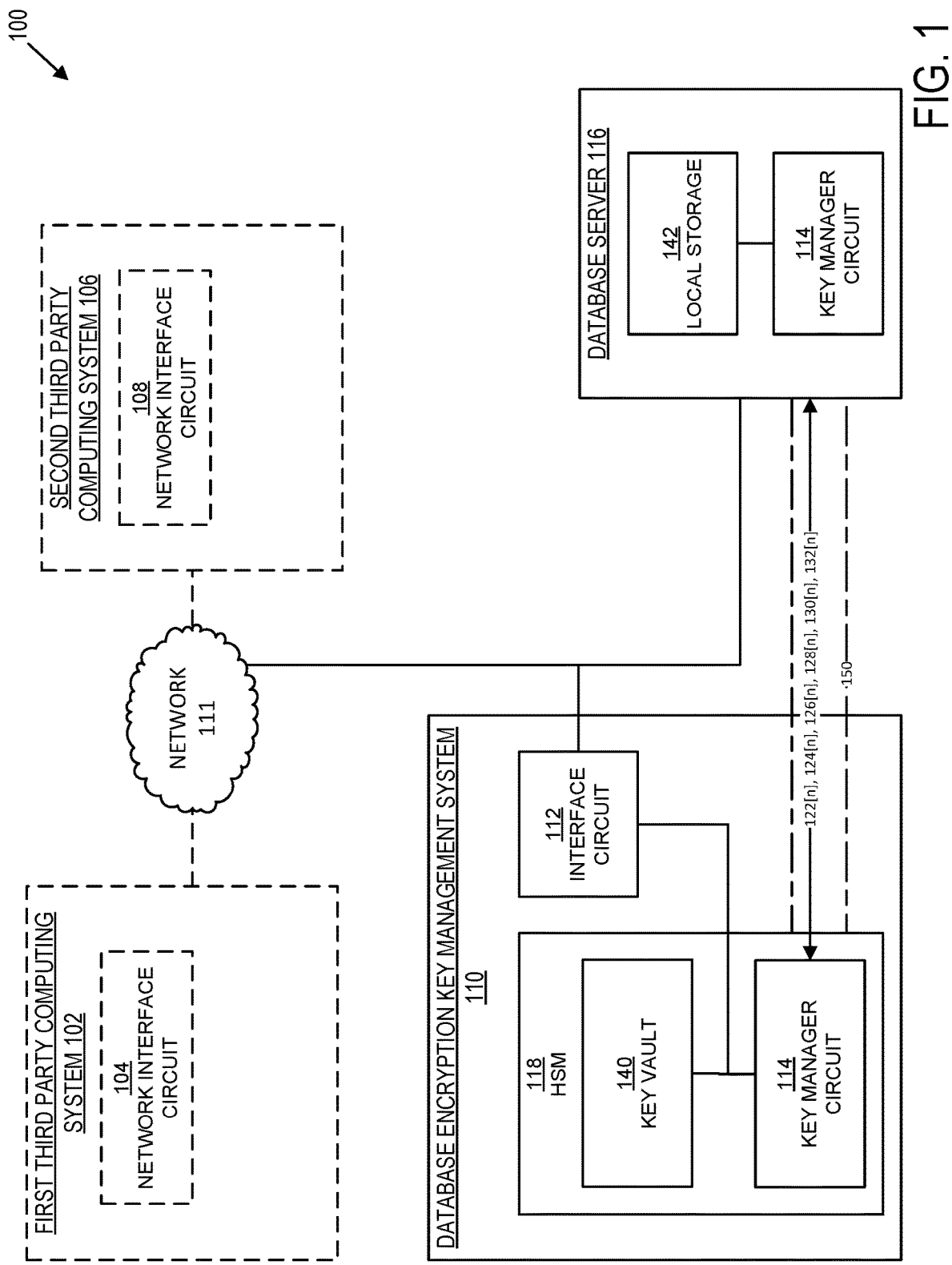
FIG. 1 is a component diagram of an electronic system comprising a database encryption key management system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Conventionally, database encryption is typically done using cryptographic software modules on the database servers. Consequently, DEKs are kept in the database system memory and used with cryptographic software to encrypt and decrypt data. For secure key management reasons, the DEK cannot not be stored as cleartext, which is easily compromised. Conventionally, a DEK may itself be encrypted using a key encryption key (KEK). However, encrypting the DEK with another key for local storage does not address the key management issue as the KEK must likewise be stored as cleartext somewhere. Using an HSM properly avoids this circular problem.

In some systems, an HSM is used with a KEK, which can be a symmetric or asymmetric solution. The DEK is encrypted using the KEK, stored externally outside the HSM, and decrypted using the KEK within the HSM. However, exposing the DEK as cleartext outside the HSM violates a fundamental principle of cryptographic control: an HSM cannot knowingly export cleartext keys. Conventionally, this control is often averted by treating the DEK as a data element and spoofing the HSM as encrypting and decrypting data instead of an actual cryptographic key.

Referring to the figures generally, various embodiments described herein relate to systems and methods for enhanced-security DEK management. According to various embodiments, an independent key manager circuit, coupled to an HSM, is structured to manage DEKs via HMAC and master keys without exporting cleartext keys. As will be appreciated, the database encryption key management system and methods comprise a database encryption key management system, a method of managing a DEK without transmitting cleartext keys, a method of generating and managing an HMAC key, a method of managing multiple unique identifiers, a method of amending unique identifiers to obscure security and system management information exposed to auxiliary systems that use the DEK management system, a method of managing a DEK management system with multiple components, such as multiple database servers and HSMs, and a method of managing DBEKSM.

FIG. 1 is a component diagram of an electronic system 100 comprising a database encryption key management system 110, according to an example embodiment. The database encryption key management system 110 includes an HSM 118 and a database server 116. The database encryption key management system 110 is structured so that the HSM 118 manages DEKs generated by the database server 116 without exporting cleartext keys. Exporting cleartext keys is a violation of a core tenet of cryptographic key management. According to various example embodiments, as described in further detail herein, systems and methods described herein provide a technical solution to the computer-centric and internet-centric problem of encrypting data for local storage with the use of an HSM without having to transmit cleartext keys between the HSM and the database server. The problem arises, in particular, in the context of data storage, especially when large volumes of data are stored and processed, because database encryption typically has too high data volumes for a cryptographic HSM itself to encrypt and decrypt the data. Therefore, conventional systems rely on software implemented outside both the HSM and the database server to manage the encryption process. However, this exposes encryption information, including encryption keys, to systems and entities outside the HSM and the database server. In the event these systems are hacked, an intruder may compromise the data by obtaining unauthorized access to the keys managed via add-on encryption software. Advantageously, the systems and methods disclosed herein eliminate this problem because the master key manager circuit is implemented to structure communications between the database server and the HSM such that encryption keys are not stored locally or exposed outside the boundaries of the system.

According to various embodiments, the HSM 118 generates a master key encryption key 122 and an HMAC key 124, which are never transmitted outside the HSM 118 and may be stored in a key vault 140 of the HSM 118. The HSM 118 encrypts the HMAC key 124 using the master key encryption key 122 to generate an HMAC cryptogram 126, which is transmitted to the database server 116. The database server 116 generates a unique identifier 128 and stores the HMAC cryptogram 126 and the unique identifier 128 in its local storage 142. In order to generate the DEK 130, the database server 116 transmits the HMAC cryptogram 126 and the unique identifier 128 to the HSM 118. The HSM 118 generates a seed 132 using the HMAC key 124 and the unique identifier 128, and transmits the seed 132 back to the database server 116. The seed 132 can be conceptualized as a shared secret between the HSM 118 and the database server 116. The database server 116 derives a DEK 130 using the seed 132 as an input to a key derivation algorithm. Accordingly, the database encryption key management system 110 enables secure database encryption key management without transmitting cleartext keys.

As shown in FIG. 1, the example configuration comprising the database encryption key management system 110 may be used to secure the content of a database on the database server 116 such that vulnerability of the database to external attacks, and the likelihood that the data stored therein would be compromised, are minimized. Additionally, in some embodiments, the system 100 may comprise a first third-party computing system 102, a second third-party computing system 106, and the database encryption key management system 110, each component being in operative communication with the others via a network 111. The network 111 is a telecommunications network of a suitable topology (e.g., the internet, intranet, peer-to-peer), using any suitable medium (e.g., wireless, fiber-optic, cellular, cable, telephone) and any suitable communications protocol (e.g., IEEE 802.x, Internet Protocol Suite, near-field communications).

Multiple parties, such as users of the first third-party computing system 102 and the second third-party computing system 106, submit requests for encrypted data, which they receive via the network 111. For example, the first party may be a first merchant that stores sensitive customer information, such as credit card numbers and security codes, on the database server 116, which, in this case, is associated with the first third-party computing system 102. This stored data may be associated with the HSM 118 and encrypted by the database server 116 using the DEK 130 as described further herein. In other embodiments, the second party that operates the second third-party computing system 106 may be a second merchant that stores another, separate data set containing sensitive information on a second HSM and/or a second database server (not shown) such that database servers are managed separately, as shown, for example, in FIG. 6B. Furthermore, the separately managed database servers may be managed by separate HSMs as shown, for example, in FIG. 6C.

In some embodiments, the database encryption key management system 110 comprises an interface circuit 112, a key manager circuit 114, the HSM 118, and the database server 116. The database server 116 may house a conventional data processing system, such as a database management system (DBMS) or a suitable alternative arrangement, including distributed arrangements and arrangements that are entirely software-based and where a conventional DBMS is omitted. As shown in FIG. 1, the HSM 118 is part of a database encryption key management system 110.

The interface circuit 112 is structured to facilitate operative communication between the database encryption key management system 110 and any of the first third-party computing system 102 and the second third-party computing system 106 via the network 111.

The key manager circuit 114 is structured to generate and manage various cryptographic keys, and to encrypt data elements using the cryptographic keys. In some embodiments, the key manager circuit 114 is structured to generate at least one master key encryption key 122 for storage in the HSM 118, generate at least one HMAC key 124 and at least one HMAC key cryptogram 126 for encryption performed by the database server 116, decrypt the HMAC key cryptogram 126 to generate a seed 132 after the HMAC key cryptogram 126 is processed by the database server 116, and provide the seed 132 to the database server 116 for creating a DEK 130.

The HSM 118 is structured to host the digital keys generated by the key manager circuit 114, including at least one master key encryption key 122, at least one HMAC key 124, and at least one HMAC key cryptogram 126. The HSM 118 contains the key vault 140 (e.g., a memory and/or a permanent storage module), in which the master key encryption key 122 and the HMAC key 124 are stored. In some implementations, multiple HSMs 118 may be included as described, for example, in reference to FIG. 6C. Each of these HSMs 118 may have its own key manager circuit 114, or multiple HSMs 118 may share a key manager circuit 114.

The database server 116 is communicatively coupled to the key manager circuit 114 via a secure connection 150. In some embodiments, the secure connection 150 is a Transport Layer Security (TLS) protocol-based electronic connection. In some embodiments, the secure connection 150 is a Transport Layer Security (TLS) protocol-based electronic connection. In other embodiments, the secure connection 150 is an Internet Protocol Security (IPsec)-based connection. Additionally or alternatively, the secure connection 150 may be established using a mutual authentication algorithm comprising digital certificates. After the secure connection 150 is established, the key manager circuit 114 transmits at least the HMAC cryptogram 126 to the database server 116. The database server 116 may reside at least in part on a mobile device, such that a public encryption key is securely distributed to the mobile device, and/or on an internet-of-things (IoT) device, such that that a public encryption key is securely distributed to the IoT device.

The database server 116 is structured to generate and store a unique identifier 128 that corresponds to the HMAC key 124 and/or the HMAC key cryptogram 126 provided by the key manager circuit 114. The database server 116 is also structured to provide a DEK 130, generated based at least on the seed 132 received from the key manager circuit 114. As described, for example, with reference to FIG. 4-6C, multiple DEKs may be used in a key management structure by, for example, managing multiple unique identifiers 128 using the same HMAC key 124 with the same master key encryption key 122.

The DBKEM schema and various components thereof (in particular, the key manager circuit 114) may be implemented using a suitable programming language. An example definitional framework for the key manager circuit 114 is provided below.

```
DbEKM {
  iso(1) identified-organization(3) tc68(133) country(16)
    x9(840) x95tandards(9) x9-73(73) module(0) dbekm(9) }
DEFINITIONS AUTOMATIC TAGS ::= BEGIN
-- EXPORTS All --
IMPORTS
-- X9.73 Cryptographic Message Syntax (CMS) --
AlgorithmIdentifier { }, ALGORITH, ATTRIBUTE, Attribute { },
KEY-MANAGEMENT, MessageAuthenticationCodeAlgorithm
    FROM CryptographicMessageSyntax {
      iso(1) identified-organization(3) tc68(133) country(16)
x9(840)
        x9Standards(9) x9-73(73) module(0) cms(2) v2009(1) }
-- X9.73 CMS Object Identifiers --
id-dbekm-recip-info, id-SimpleString, id-UniqueIdentifier
    FROM CMSObjectIdentifers {
      iso(1) identified-organization(3) tc68(133) country(16)
x9(840)
        x9Standards(9) x9-73(73) module(0) oids(1) v2009(1) };
-- X9.73 XML namepace: urn:oid:1.3.133.16.840.9.73 --
DB-Encryption-Key-Management KEY-MANAGEMENT ::= {
  dbekmRecipientInfo,
  . . . -- Expect additional key management objects --
}
dbekmRecipientInfo KEY-MANAGEMENT ::=
  { DBEKMRecipientInfo IDENTIFIED BY id-dbekm-recip-info }
DBEKMRecipientInfo ::= CHOICE {
  keyManager MasterKeyEncryptedHMACkey,
  server DatabaseServerToKeyManager
}
MasterKeyEncryptedHMACkey ::= SEQUENCE {
  masterKeyAID MasterKeyAlgorithmIdentifier OPTIONAL,
  hmacKeyAID MessageAuthenticationCodeAlgorithm OPTIONAL,
  encryptedKey OCTET STRING (SIZE(1..MAX))
}
MasterKeyAlgorithmIdentifier
    AlgorithmIdentifier {{MasterKeyAlgorithms}}
MasterKeyAlgorithms ALGORITHM ::= {
  . . . -- Expect additional algorithm objects --
}
DatabaseServerToKeyManager ::= SEQUENCE {
  encryptedKey MasterKeyEncryptedHMACkey,
  uniqueID UniqueIdentifier OPTIONAL -- May be known system
wide --
}
UniqueIdentifier ::= UniqueID {{ SchemaIdentifier }}
SchemaIdentifier DBEKM :: = {
  simpleString,
  . . . -- Expect additional schema identifier objects --
}
simpleString DBEKM :: = {
  OID id-SimpleString PARMS SimpleString
}
SimpleString ::= UTF8String (SIZE(1..MAX))
DBEKM ::= CLASS {
  &id OBJECT IDENTIFIER UNIQUE,
  &Type OPTIONAL
}
  WITH SYNTAX { OID &id [ PARMS &Type ] }
UniqueID { DBEKM:IOSet }::= SEQUENCE {
  name DBEKM.&id ({IOSet}),
  type DBEKM.&Type({IOSet} {@name}) OPTIONAL
}
DbEKMAttributeSet ::=
  SEQUENCE SIZE(1..MAX) OF Attribute {{ DbEKMAttributes }}
```

```
DbEKMAttributes ATTRIBUTE ::= {
   uniqueIdentifier,
      . . . -- Expect user schema identifier attributes --
}
uniqueIdentifier ATTRIBUTE ::= {
   WITH SYNTAX UniqueIdentifier ID id-UniqueIdentifier
}
END -- DbEKM --
```

Figure 2:
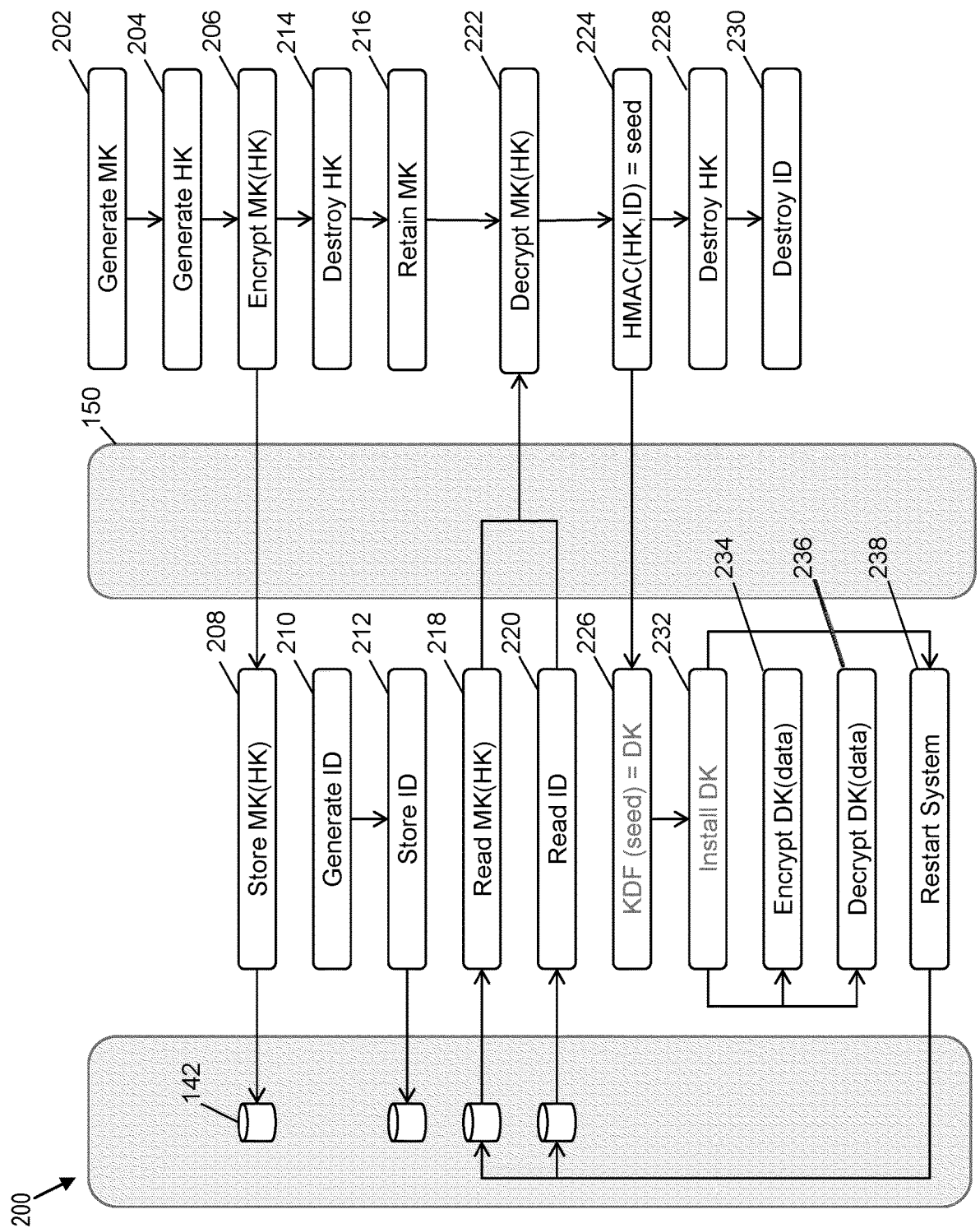
FIG. 2 is a schematic flow diagram of a method of creating an initial database encryption key on a single database server without transmitting cleartext keys, according to an example embodiment.

Referring now to FIG. 2, a method 200 of creating an initial DEK without transmitting cleartext keys is shown, according to an example embodiment. In the example embodiment, the method 200 is performed by a cryptographic module, such as the key manager circuit 114, and the interface circuit 112 of FIG. 1, via operative communication with the first third-party computing system 102 and/or the second third-party computing system 106. However, it should be understood that the method 200 may be similarly performed using other systems or components thereof, as described herein.

At 202, a master key encryption key 122 is generated by the key manager circuit 114. The key manager circuit 114 directs the HSM 118 to store the master key encryption key 122, in the cleartext format, in permanent (e.g., non-volatile) memory, such as the key vault 140 of the HSM 118. In some embodiments, the master key encryption key is encrypted by the key manager circuit 114 and stored encrypted outside the HSM 118.

At 204, a keyed-hash message authentication code (HMAC) key 124 is generated by the key manager circuit 114. The purpose of the HMAC key 124 is to further secure the message(s) exchanged by the key manager circuit 114 and the database server 116 across the secure connection 150 by verifying the data integrity and origin authenticity of each message.

At 206, a HMAC key cryptogram 126 is generated by the key manager circuit 114 by encrypting the HMAC key 124 with the master key encryption key 122. At 214, the HMAC key 124 is deleted to avoid security vulnerabilities associated with permanently storing the HMAC key 124. The master key encryption key 122, however, is retained at 216 and stored on the HSM 118.

At 208, the interface circuit 112 provides the HMAC key cryptogram 126 to the database server 116 via the secure connection 150. The database server 116 stores the HMAC key cryptogram 126 in local storage 142. In embodiments where the database server 116 is part of an electronic device, such as a mobile device or an IoT device, the HMAC key cryptogram 126 is stored in permanent memory of the electronic device.

Figure 5:
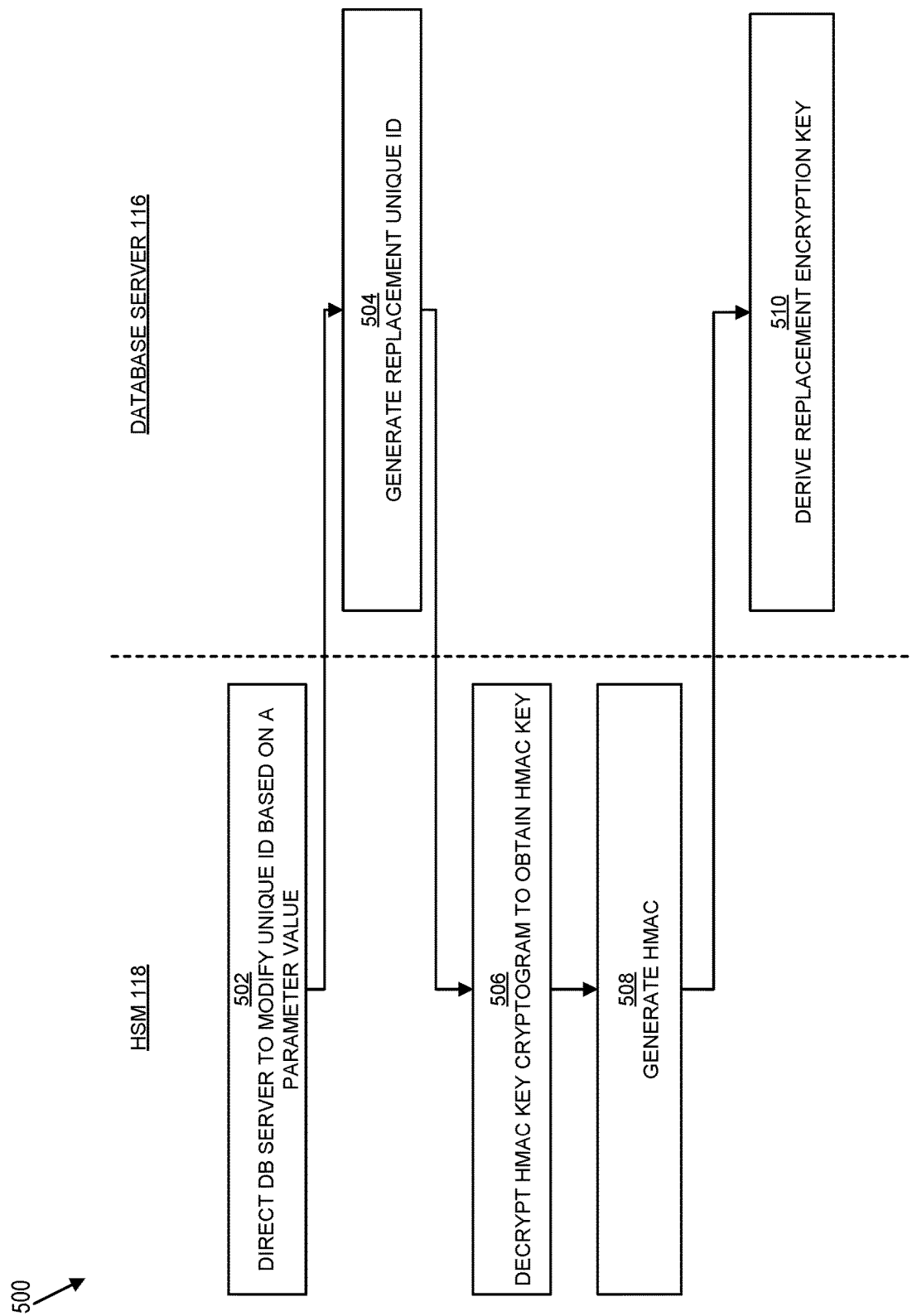
FIG. 5 is a schematic flow diagram of a method of generating unique identifiers in a database encryption key management protocol, according to an example embodiment.

At 210, the database server 116 generates a unique identifier 128 as described further herein in reference to FIG. 5. The purpose of the unique identifier 128 is to uniquely identify to the database server 116 to the HSM 118. In some embodiments, the unique identifier 128 comprises an ordered list of database server attributes. The database server attributes may include database properties: for example, a host name, a geographic location indicator, a database server identifier, a database application name (e.g., in embodiments where a database application generates the unique identifier 128), a string identifying a database encryption algorithm used in the transaction, and/or a string identifying a data element in the database.

At 212, the database server 116 stores the unique identifier 128 in local storage 142 associated with the database server 116.

Processes 218-238 pertain to generating the DEK 130, which is used by the database server 116 to cryptographically protect the data processed by the database server 116.

To obtain a seed for the DEK 130, the database server 116 sends a request to the HSM 118 over the secure connection 150. At 218, the database server 116 retrieves the HMAC key cryptogram 126 from the local storage 142. At 220, the database server 116 retrieves the unique identifier 128 from the local storage 142. These retrieved values are sent to the HSM 118 through the secure connection 150.

At 222, the HMAC key cryptogram 126 is decrypted by the key manager circuit 114 using the master key encryption key 122 to obtain the HMAC key 124. At 224, a seed 132 is generated by the key manager circuit 114 using the HMAC key 124 and the unique identifier 128. Advantageously, at 228 and 230, respectively, the HMAC key 124 and the unique identifier 128 are deleted from the HSM 118 to reduce security vulnerabilities. The seed 132 is generated by calling an HMAC function, the executable file for which may be, for example, installed on the HSM 118, and the seed 132 is transmitted to the database server 116 through the secure connection 150. The purpose of the seed 132 is to securely generate a secret value that serves as an input to a key derivation function (KDF) executed on the database server 116 to generate the DEK 130.

At 226, the database server 116 derives the DEK 130 using the seed 132 as an input to a KDF. According to various embodiments, the algorithm for the KDF is based on, for example, NIST SP 800-108, ISO/IEC 11770-6, or another suitable standard.

At 232, the DEK 130 is installed on the database server 116. At 234 and 236, respectively, the data processed on the database server 116 is encrypted and decrypted using the DEK 130. Advantageously, the DEK 130 is not stored in local storage 142 associated with the database server 116.

When the database server 116 is restarted at 238, the DEK 130, which is stored in volatile memory of the database server 116, is erased. As used herein, the term "volatile memory" refers to computer storage that maintains its data only while the device (e.g., the database server 116) is powered. The term "non-volatile memory" refers to long-term persistent storage implemented, for example, on permanent computer storage media, that maintains its data even when the device is powered off. The database server 116 can regenerate the DEK 130 by reacquiring the seed 132. When the database server 116 is restarted, the process returns to 218, such that the database server 116 again retrieves the HMAC key cryptogram 126 and the unique identifier 128 from the local storage 142 and uses these items to request the seed 132 from the HSM 118 so as to regenerate the DEK 130.

Figure 3:
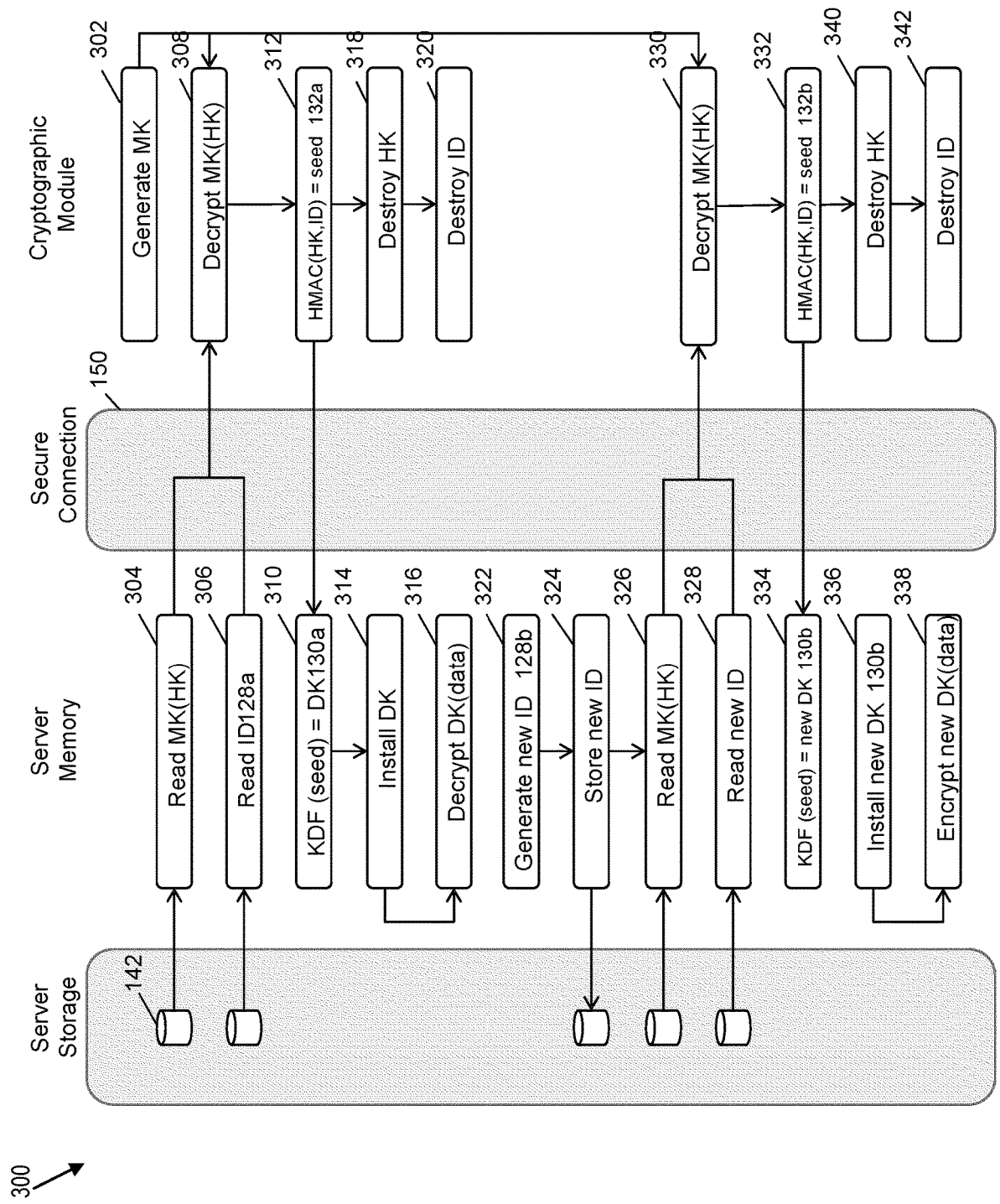
FIG. 3 is a schematic flow diagram of replacing a database encryption key with a new database encryption key without transmitting cleartext keys, according to an example embodiment.

Referring now to FIG. 3, a method 300 is shown for replacing a database encryption key 130a with a new database encryption key 130b without transmitting cleartext keys, according to an example embodiment. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, the database server 116 can change the DEK 130a at any time by changing the unique identifier 128a.

As shown at 302-316 and similar to the process described in FIG. 1, the data was previously encrypted by the database server 116 by sending a request to the HSM 118 with the HMAC key cryptogram 126 and the unique identifier 128*a*, generating the DEK 130*a* using the KDF with the seed 132*a* received from the HSM 118, and encrypting the data using the DEK 130*a* stored in volatile memory of the database server 116.

To change the DEK 130*a*, the database server 116 generates and stores a new unique identifier 128*b* at 322 and 324, respectively. The database server 116 sends a request to the HSM 118 with the HMAC key cryptogram 126, retrieved from local storage 142 at 326, and the new unique identifier 128*b* retrieved from local storage 142 at 328.

At 330, the HMAC key cryptogram 126 is decrypted by the key manager circuit 114 using the master key encryption key 122 to obtain the HMAC key 124. At 332, a new seed 132*b* is generated by the key manager circuit 114 using the HMAC key 124 and the unique identifier 128*b*. Advantageously, at 340 and 342, respectively, the HMAC key 124 and the unique identifier 128*b* are deleted from the HSM 118 to reduce security vulnerabilities.

At 334, the database server 116 generates a new DEK 130*b* using the new seed 132*b* generated by the HSM 118 at 332, installs the new DEK 130*b* (at 336) and encrypts the data (at 338) using the new DEK 130*b*.

According to various embodiments, the database server 116 can decrypt data with the old DEK 130*a* and re-encrypt the data with the new DEK 130*b*. This can be done with all of the data at once, or managed as a gradual migration between the old DEK 130*a* and the new DEK 130*b*.

Advantageously, the HSM 118 only retains the master key encryption key 122. The HSM 118 destroys the old DEK 130*a* and the new DEK 130*b*, the old unique identifier 128*a* and the new unique identifier 128*b*, and the old and new seeds 132*a* and 132*b*, respectively. As to the database server 116, as long as the database server 116 can manage and generate its unique identifiers 128*n*, it can manage and replace its DEKs 130*n* accordingly. Advantageously, the database server 116 cannot generate a new DEK 130*b* without obtaining a new seed 132*b* from the HSM 118. In some embodiments, the database server 116 can recover the old DEK 130*a* as needed, as long as the database server 116 archives the HMAC key cryptogram 126 and the associated old unique identifier 128*a*.

Figure 4:
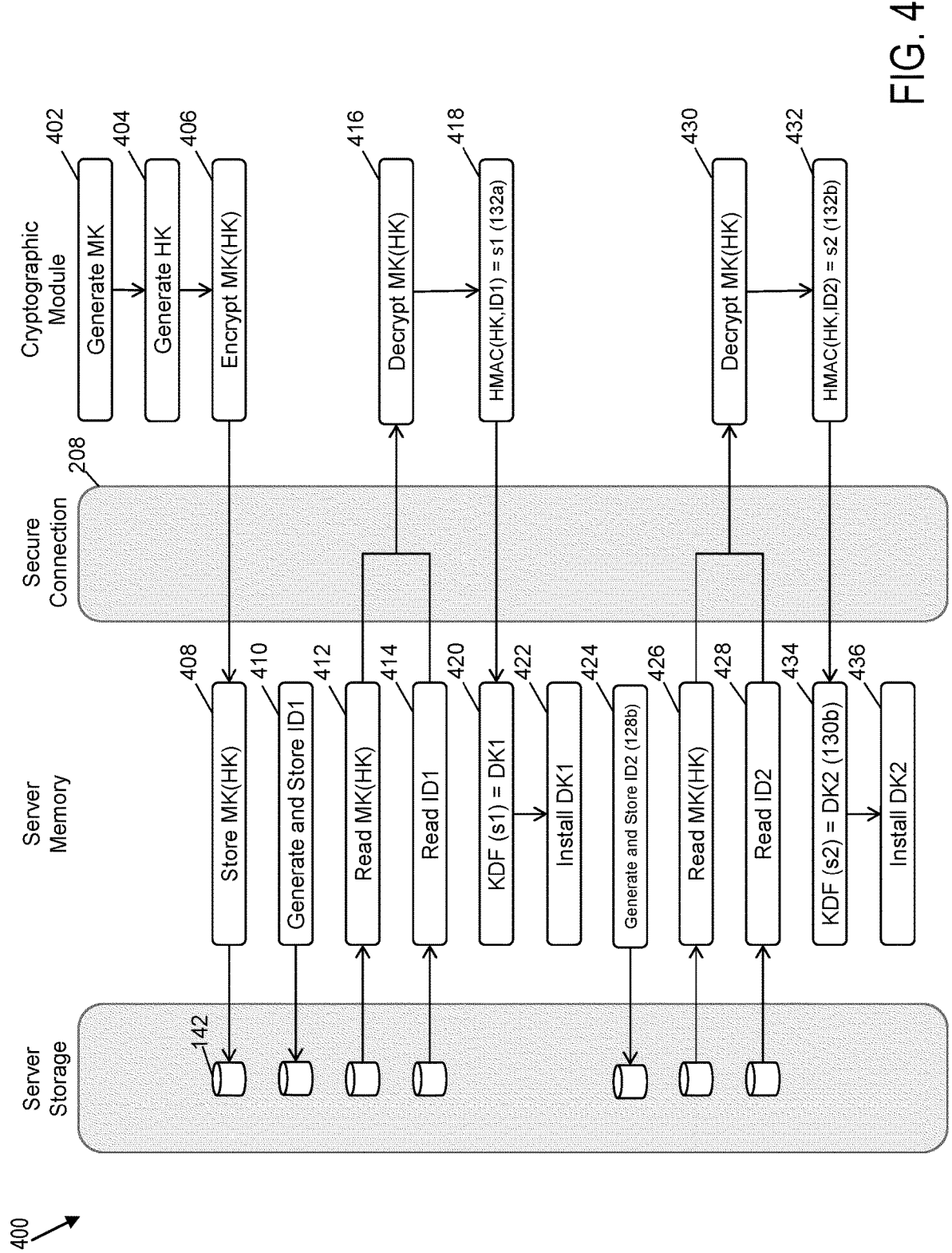
FIG. 4 is a schematic flow diagram of a method of managing multiple database encryption keys on a single database server using the same HMAC key with the same master key encryption key.

Referring now to FIG. 4, a method 400 of managing multiple database encryption keys 130 on a single database server using the same HMAC key 124 with the same master key encryption key 122 is shown, according to an example embodiment. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, a single database server 116 might need multiple DEKs 130*n* to protect different information instead of using the same DEK, such as the DEK 130*a*, for all data that needs encryption.

As shown and similar to the process described in FIG. 1, the database server 116 can manage multiple DEKs 130*a* and 130*b* by managing multiple unique identifiers 128*a* and 128*b*. The cryptographic module, such as the HSM 118, generates a single master key encryption key 122 and a single HMAC key 124, encrypts the HMAC key 124 using the master key encryption key 122, and sends the HMAC key cryptogram 126 to the database server 116 over a secured channel, such as the secure connection 150. The database server 116 stores the HMAC key cryptogram 126 and, at some previous or subsequent point in time, the database server 116 generates multiple unique identifiers, such as the first unique identifier 128*a* and the second unique identifier 128*b*: one unique identifier, respectively, for the first DEK 130*a* and the second DEK 130*b*. Meanwhile, the cryptographic module, such as the HSM 118, destroys the HMAC key 124 but retains the master key encryption key 122.

To obtain a seed 132*a* for the first DEK 130*a*, the database server 116 sends a request to the HSM 118 over the secure connection 150. The request contains the HMAC key cryptogram 126 and the first unique identifier 128*a*. The HSM 118 decrypts the HMAC key 124 using the master key encryption key 122, generates the seed 132*a* using the HMAC algorithm with the HMAC key 124 and the first unique identifier 128*a*, and sends the seed 132*a* to the database server 116 over the secured connection 150. The server generates the first DEK 130*a* using a suitable KDF function with the seed 132*a* and installs the DEK 130*a* into its memory for data encryption and decryption. Meanwhile, the HSM 118 destroys the HMAC key 124 and the seed 132*a*.

To obtain a seed 132*b* for the second DEK 130*b*, the database server 116 sends a request to the HSM 118 over the secure connection 150. The request contains the HMAC key cryptogram 126 and the second unique identifier 128*b*. The HSM 118 decrypts the HMAC key 124 using the master key encryption key 122, generates the second seed 132*b* using the HMAC algorithm with the HMAC key 124 and the second unique identifier 128*b*, and sends the second seed 132*b* to the database server 116 over the secured connection 150. The server generates the second DEK 130*b* using a suitable KDF function with the second seed 132*b* and installs the DEK 130*b* into memory for data encryption and decryption. Meanwhile, the HSM 118 destroys the HMAC key 124 and the second seed 132*b*.

When the database server 116 is restarted and the DEKs are erased from memory, the database server 116 can regenerate the DEKs by reacquiring the first seed 132*a* and the second seed 132*b* at any time by resending the HMAC key cryptogram 126 as well as the first unique identifier 128*a* and the second unique identifier 128*b* to the HSM 118.

Referring now to FIG. 5, a method 500 of generating and replacing unique identifiers 128 is shown, according to an example embodiment. A unique identifier 128 may be amended in order to add an extra layer of data privacy. To accomplish this, in some embodiments, the key manager circuit 114 maintains a repository of replacement identifiers that obscure network management information, database management information, and/or the encryption schema that is used (e.g., AES512, AES256, etc.) to generate the master key encryption key. This information may be replaced with non-descriptive values for which a translation table is not exposed to entities outside the database encryption key management system 110.

In method 500 of FIG. 5, at 502, the key manager circuit 114 directs the database server to modify the unique identifier 128 based on a value supplied by the system administrator through the key manager circuit 114. In some embodiments, the key manager circuit 114 generates the unique identifier 128. In some embodiments, the value supplied by the key manager circuit 114 includes a parameter that identifies the database server 116. In certain embodiments, the parameter includes at least an object identifier associated with the database server 116. The object identifier may be globally unique or may be unique in a specified context. The parameter may include a Relative Object Identifier string that may be parsed and stored as an XML-represented string. The Relative Object Identifier may be encoded as a binary value.

In one example embodiment, the object identifier is a relative OID that represents a date/time value, a date time variable may be declared in a suitable programming language as follows:

DateTime::=RELATIVE-OID--{yy mm dd hh mm ss z}

For instance, the following value of DateTime can be used to represent Jan. 1, 2001 00:00:00 (GMT):

example DateTime::={year(2001) month(1) day(1) hours (0) minutes(0) seconds(0) z(0)}

This example value can be encoded for transfer using an encoding schema, such as a Distinguished Encoding Rules (DER) based schema, in only eight octets and can be represented by the hexadecimal value "07 D1 01 01 00 00 00 00".

In another example embodiment, the relative OID represents the relevant components of the network as well as the encryption algorithm used to generate the master key encryption key, as shown below:

example Custom=::={dataCenter(7) server(9) DB(2) column(3) algorithm(9)}

In yet another example embodiment, the relative OID is defined as follows:

```
dbEKM OID ::= {
    joint-iso-itu-t(2) country(16) us (840) organization(1)
wfbna(114171)
    lobs(4) eisArchitecture(1) techniques(2) dbEKM(0)
}
id-SimpleString OID ::= { dbEKM ss(1) }
id-UniqueIdentifier OID ::= { dbEKM uid(2) }
id-dbekm-recip-info OID ::= { iso member-body(2) us(840)
x973(10060) km(2) 3 }
```

Similar to the first example, the CustomID value may be encoded in eight octets and represented by a non-descriptive hexadecimal value. Thus, compact binary encodings of this information are achieved, which provides additional communications security and increases throughput via the network 111.

Referring to the method 500 of FIG. 5, at 504, the interface circuit 112 generates a new unique identifier 128*c*. In some embodiments, as shown above, the new unique identifier 128*c* comprises an ordered list of database server attributes, such as a host name, a geographic location indicator, a database server identifier, a database application name in embodiments where a database application generates the substitute unique identifier 128*c*, a string identifying a database encryption algorithm used in the transaction, and/or a string identifying an element of a data element in the database.

At 506, the key manager circuit 114 retrieves the HMAC key cryptogram 126 and the new unique identifier 128*c* provided by the database server 116 via the secure connection 150.

At 508, according to some embodiments, a replacement HMAC 132*b* is generated by the key manager circuit 114 using the HMAC key cryptogram 126 and the new unique identifier 128*c*.

At 510, the replacement HMAC 132*b* is transmitted by the key manager circuit 114, via the secure connection 150, to the database server 116. The database server 116 is configured to derive a replacement DEK 130*c* using at least the replacement HMAC 132*b* as an input to a key derivation algorithm as described, for example, in FIG. 4. The replacement DEK 130*c* is stored in volatile memory of the database server 116.

Referring now to FIG. 6A-6C, component diagrams of database servers for managing different groups of DEKs are shown, according to example embodiments. These configurations add extra layers of data security, as set forth herein.

Referring now to FIG. 6A, the infrastructure 600 comprises a first database server 612 and a second database server 614. A component diagram is shown where a unique HMAC key 124 is generated per database server 116, which eliminates the need to reuse the same seed across multiple databases and provides additional security in the event one of the databases is compromised. Here, the key manager circuit 114 is included within a single HSM 610. In an example embodiment, the key manager circuit 114 generates a first HMAC key 124 corresponding to the first database server 612, and a second HMAC key 124*b*, corresponding to the second database server 614. As to the first database server 612, generating a DEK by the first database server 612 is managed according, for example, to the method illustrated in FIG. 2. As to the second database server 614, the key manager circuit 114 encrypts the second HMAC key 124*b* using the master key encryption key 122 to generate the third HMAC key cryptogram 126*c* such that the master key encryption key 122 remains the same for both database servers. The third HMAC key cryptogram 126*c* is provided to the second database server 614, which generates a third unique identifier 128*d* and a third DEK 130*d*. Thus, the DEK generated by the second database server 614 is different from the DEK generated by the first database server 612.

Referring now to FIG. 6B, a component diagram is shown where the key manager circuit 114 is comprised within a single HSM 660. The same master key encryption key 122 is used for multiple database servers 116 but a unique master key encryption key 122 is used per database group (652, 654) by managing multiple master key encryption keys 122 per HSM. Thus, data in each database group is encrypted using a separate master key encryption key.

In an example embodiment, the infrastructure 650 comprises a first database group 652 and a second database group 654. The key manager circuit 114 manages the infrastructure by associating the first master key encryption key 122 with the first database group 652, which may include a first database server 116. Additionally or alternatively, a master file key may be used to manage multiple master key encryption keys. The key manager circuit 114 associates the second master key encryption key 122*b* with the second database group 654, which may include a second database server. The key manager circuit 114 associates both database groups with the HSM 660. Thus, multiple master key encryption keys are managed by HSM 660, providing additional security in the event one of the database groups (652, 654) is compromised. For example, if an intruder obtains the master key encryption key 122, only the first database group 652 would be compromised because the master key encryption key 122*b* used for the second database group 654 would be different from the master key encryption key 122. Thus, the integrity of data residing in databases included in the second database group 654 would be protected.

Referring now to FIG. 6C, a component diagram is shown where a unique master key encryption key is used per HSM, providing additional security in the event one of the HSMs is compromised. In an example embodiment, the key manager circuit 114 is coupled to a first HSM 690 and a second HSM 692. The first HSM 690 is associated, by the key manager circuit 114, with a first database group 678, and the second HSM 692 is associated the second database group 680, with separate master key encryption keys 122 being stored and/or associated with each HSM. If an intruder gains unauthorized access to the first HSM 690, only the first database group 678 would be compromised. Thus, the integrity of data residing in databases included in the second database group 654, associated with the second HSM 692, would be protected.

Figure 7:
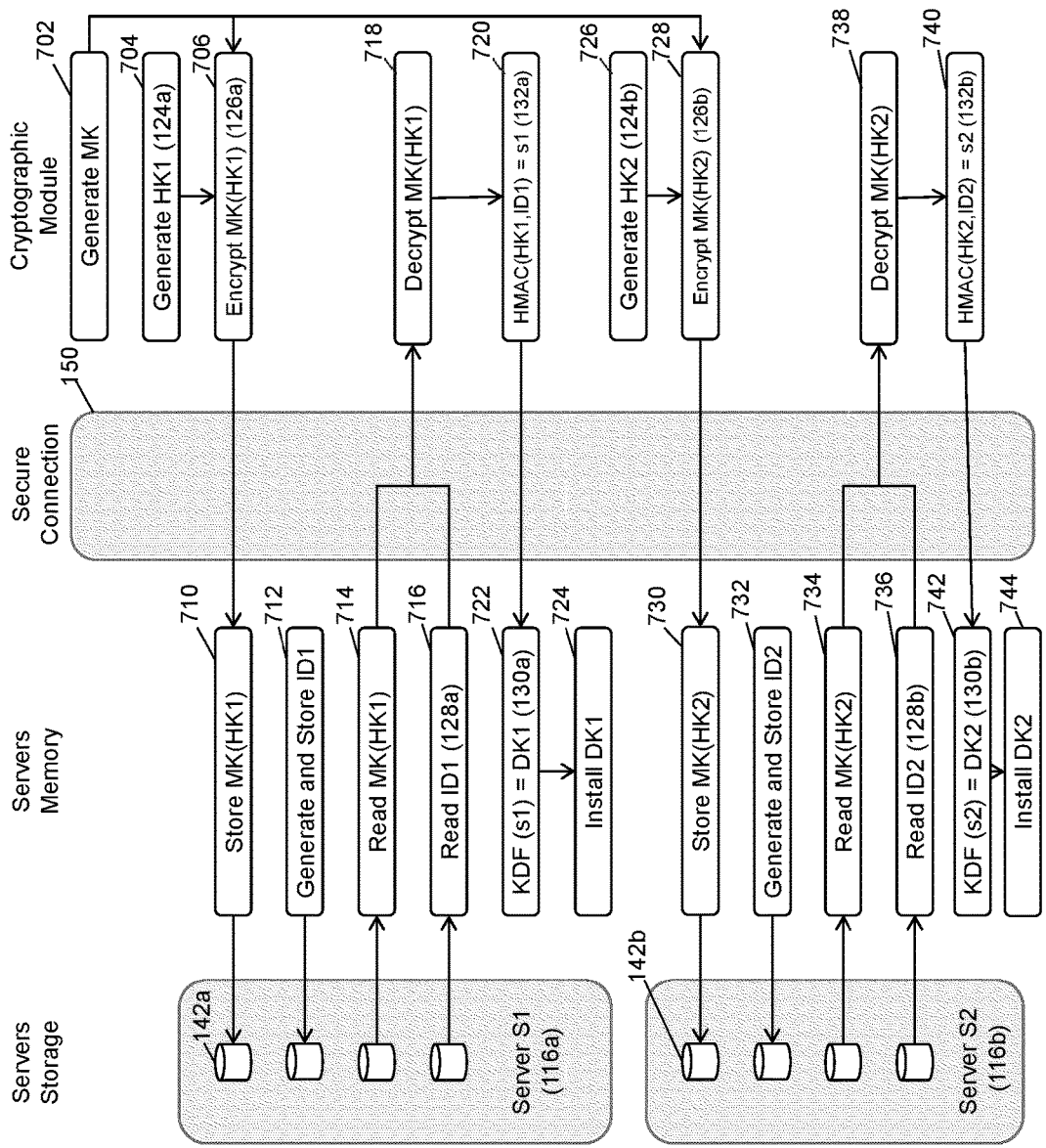
FIG. 7 is a schematic flow diagram of a method of managing more than one database encryption key on more than one database server without transmitting cleartext keys, according to an example embodiment.

Referring now to FIG. 7, a schematic flow diagram is shown of a method 700 of managing more than one database encryption key on more than one database server without transmitting cleartext keys, according to an example embodiment. In the example embodiment, the multiple HMAC keys are managed using a single master key encryption key. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, multiple database servers 116n might each need a unique DEK 130n.

The cryptographic module, such as the HSM 118, generates a single master key encryption key 122 and multiple HMAC keys 124n, including the first HMAC key 124a and the second HMAC key 124b. One HMAC key is generated per each database server 142a and 142b. The HSM 118 encrypts each HMAC key using the master key encryption key 122, and sends each HMAC cryptogram, 124a and 124b, to the corresponding database server, 142a and 142b, over secure connection 150. The database servers 142a and 142b each store its HMAC cryptogram, 142a and 142b, respectively. At some previous or subsequent point in time, each of database servers 116a and 116b generates a unique identifier, such as the first unique identifier 128a and the second unique identifier 128b, respectively, for the first DEK 130a and the second DEK 130b. Meanwhile, the cryptographic module, such as the HSM 118, destroys the HMAC key 124 but retains the master key encryption key 122.

To obtain a seed 132a for the first DEK 130a, the database server 116a sends a request to the HSM 118 over the secure connection 150. The request contains the first HMAC key cryptogram 126a and the first unique identifier 128a. The HSM 118 decrypts the first HMAC key 124a using the master key encryption key 122, generates seed 132a using the HMAC algorithm with the first HMAC key 124a and the first unique identifier 128a, and sends the seed 132a to the database server 116a over the secured connection 150. The database server 116a generates the first DEK 130a using a suitable KDF function with the seed 132a and installs the DEK 130a into memory for data encryption and decryption. Meanwhile, the HSM 118 destroys the first HMAC key 124a and the seed 132a.

To obtain a seed 132b for the second DEK 130b, the database server 116b sends a request to the HSM 118 over the secure connection 150. The request contains the second HMAC key cryptogram 126b and the second unique identifier 128b. The HSM 118 decrypts the second HMAC key 124b using the master key encryption key 122, generates the second seed 132b using the HMAC algorithm with the second HMAC key 124b and the second unique identifier 128b, and sends the second seed 132b to the database server 116b over the secured connection 150. The database server 116b generates the second DEK 130b using a suitable KDF function with the second seed 132b and installs the DEK 130b into memory for data encryption and decryption. Meanwhile, the HSM 118 destroys the second HMAC key 124b and the second seed 132b.

When the database server 116n is restarted and the DEKs are erased from memory, the database server 116n can regenerate the DEKs by reacquiring the first seed 132a and the second seed 132b as described, for example, with reference to FIG. 4.

Figure 8:
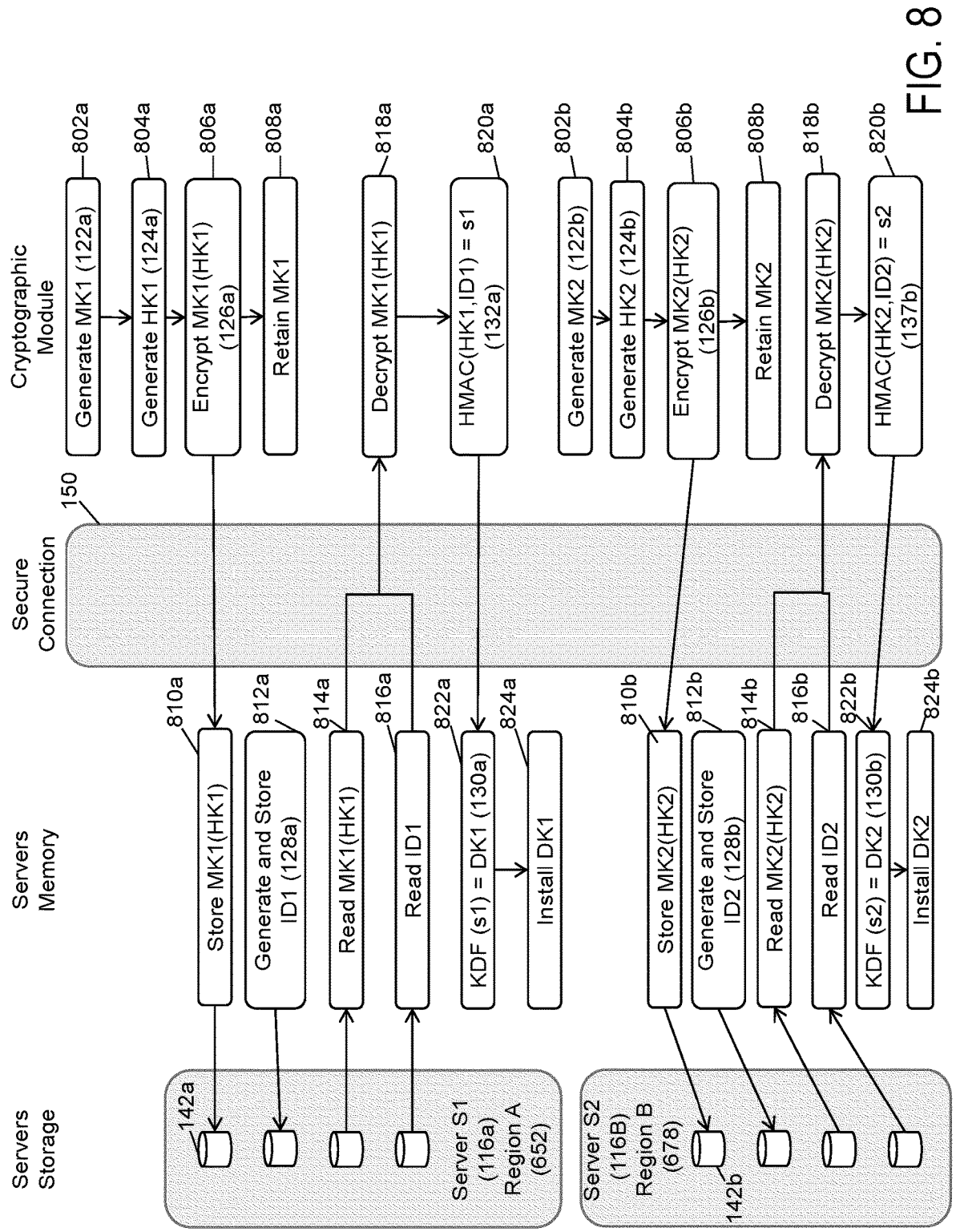
FIG. 8 is a schematic flow diagram of a method of managing more than one HMAC key on more than one database server without transmitting cleartext keys, according to an example embodiment.

Referring now to FIG. 8, a schematic flow diagram is shown of a method 800 of managing more than one HMAC key on more than one database server without transmitting cleartext keys, according to an example embodiment. In the example embodiment, the multiple HMAC keys are managed using multiple master key encryption keys. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, in the example embodiment, multiple database servers 116n might each need a unique HMAC key 124n.

The cryptographic module, such as the HSM 118, generates a multiple master key encryption keys 122n, including the first master key encryption key 122a and the second master key encryption key 122b, and multiple HMAC keys 124n, including the first HMAC key 124a and the second HMAC key 124b. One master key encryption key HMAC key1 24n is generated per each database server 116a and 116b. The HSM 118 encrypts each HMAC key 124n using the master key encryption key 122n. For example, the first HMAC key 124a is encrypted using the first master key encryption key 122a and the second HMAC key 124b is encrypted using the second master key encryption key 122b. The HSM 118 sends each HMAC cryptogram, 142a and 142b, to the corresponding database server, 116a and 116b, over a the secure connection 150.

The database servers 116a and 116b each store its HMAC cryptogram, 124a and 124b, respectively. At some previous or subsequent point in time, each of database servers 116a and 116b generates a unique identifier, such as the first unique identifier 128a and the second unique identifier 128b, respectively, for the first DEK 130a and the second DEK 130b. Meanwhile, the cryptographic module, such as the HSM 118, destroys the HMAC keys 124n but retains the master key encryption keys 122n.

To obtain a seed 132a for the first DEK 130a, the database server 116a sends a request to the HSM 118 over the secure connection 150. The request contains the first HMAC key cryptogram 126a and the first unique identifier 128a. The HSM 118 decrypts the first HMAC key 124a using the first master key encryption key 122a, generates seed 132a using the HMAC algorithm with the first HMAC key 124a and the first unique identifier 128a, and sends the seed 132a to the database server 116a over the secured connection 150. The database server 116a generates the first DEK 130a using a suitable KDF function with the seed 132a and installs the DEK 130a into memory for data encryption and decryption. Meanwhile, the HSM 118 destroys the first HMAC key 124a and the seed 132a.

To obtain a seed 132b for the second DEK 130b, the database server 116b sends a request to the HSM 118 over the secure connection 150. The request contains the second HMAC key cryptogram 126b and the second unique identifier 128b. The HSM 118 decrypts the second HMAC key 124b using the second master key encryption key 122b, generates the second seed 132b using the HMAC algorithm with the second HMAC key 124b and the second unique identifier 128b, and sends the second seed 132b to the database server 116b over the secured connection 150. The database server 116b generates the second DEK 130b using a suitable KDF function with the second seed 132b and installs the DEK 130b into memory for data encryption and decryption. Meanwhile, the HSM 118 destroys the second HMAC key 124b and the second seed 132b.

When the database server 116n is restarted and the DEKs are erased from memory, the database server 116n can regenerate the DEKs by reacquiring the first seed 132a and the second seed 132b as described, for example, with reference to FIG. 4.

Figure 9:
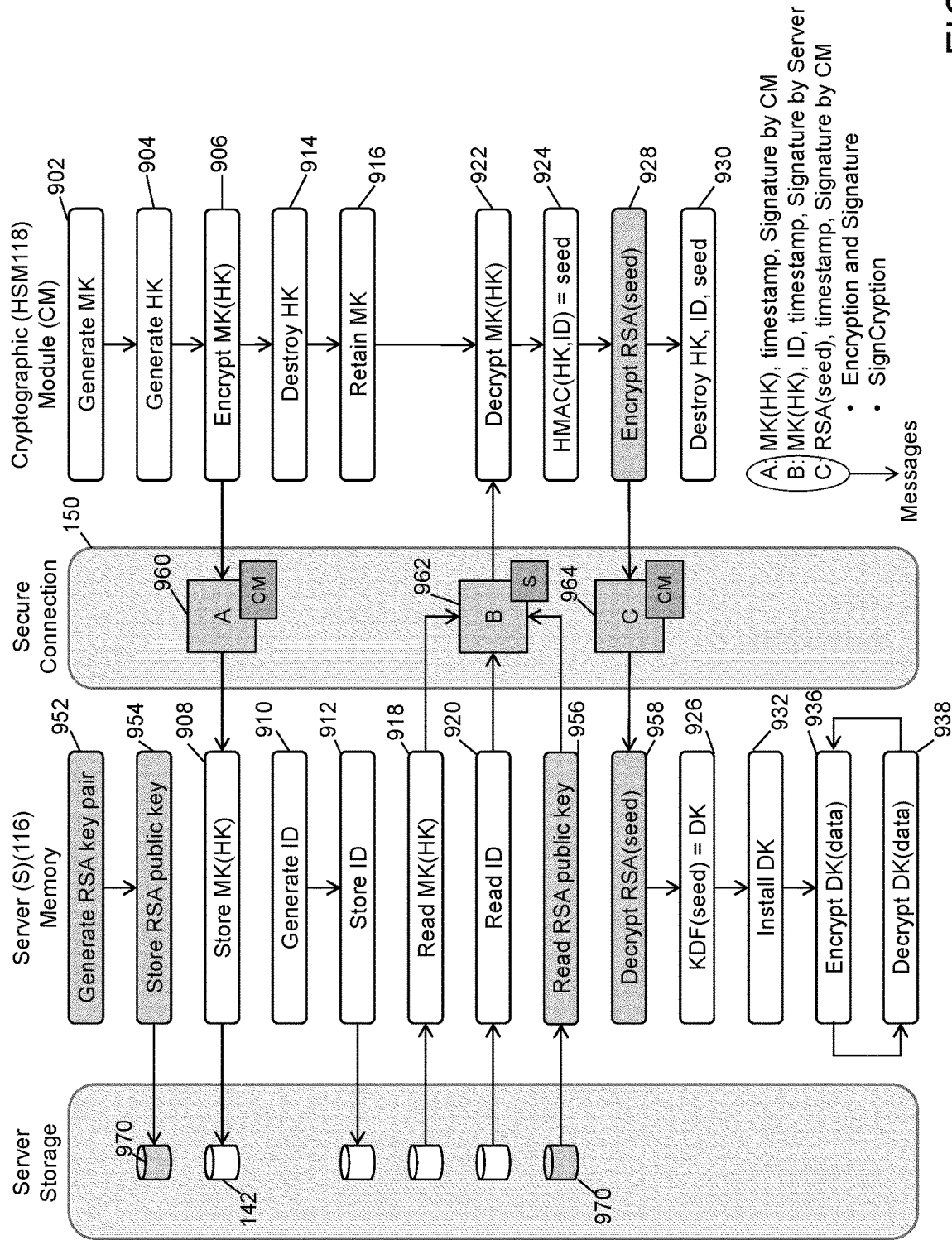
FIG. 9 is a schematic flow diagram of a database encryption secure key management (DBESKM) protocol.

Referring now to FIG. 9, depicted is a schematic flow diagram 900 of a database encryption secure key management (DBESKM) protocol. The relevant items discussed below are generated and managed by the key manager circuit 114 of the HSM 118 via instructions transmitted to the database server 116 by the interface circuit 112 though the secure connection 150. Thus, the steps described herein, in some embodiments, are performed by the database server 116 or the HSM 118 in response to these instructions. As shown, DBESKM enhances DBEKM by adding encryption of the seed 132 and/or other elements exchanged between the database server 116 and the HSM 118 using asymmetric cryptography (e.g. RSA) and digital signatures (e.g. RSA, DSA, and/or ECDSA). Advantageously, the seed 132 and/or other elements are doubly encrypted, once with the server public and again with the secure connection.

DBESKM makes use of currently known encryption algorithms (e.g. AES 256, FIPS 197), the keyed hash message authentication code (HMAC) algorithm (FIPS 198-1) using currently known hash algorithms (e.g., SHA 256, FIPS 180-4), a suitable key derivation algorithm (e.g. SHA 256, FIPS 180-4), and currently known methods for digital signatures (e.g. RSA, X9.31, DSA, FIPS 186-4, ECDSA, X9.62). In some embodiments, cryptographically protected items are packaged into X9.73 messages, such as SignedData and NamedKey EncryptedData. According to various embodiments, DBESKM may incorporate additional asymmetric cryptography (e.g. Signcryption, X9.73, ISO/IEC 29150) and quantum resistant algorithms (e.g. Lattice-Based Polynomial Public Key Establishment Algorithm, X9.98) to cryptographically protect the seed 132 and/or other elements.

At 902, a master key encryption key 122 is generated by the key manager circuit 114. The key manager circuit 114 directs the HSM 118 to store the master key encryption key 122, in the cleartext format, in permanent (e.g., non-volatile) memory, such as the key vault 140 of the HSM 118. In some embodiments, the master key encryption key is encrypted by the key manager circuit 114 and stored encrypted outside the HSM 118.

At 904, a keyed-hash message authentication code (HMAC) key 124 is generated by the key manager circuit 114. The purpose of the HMAC key 124 is to further secure the message(s) exchanged by the key manager circuit 114 and the database server 116 across the secure connection 150 by verifying the data integrity and origin authenticity of each message.

At 906, a HMAC key cryptogram 126 is generated by the key manager circuit 114 by encrypting the HMAC key 124 with the master key encryption key 122. At 914, the HMAC key 124 is deleted to avoid security vulnerabilities associated with permanently storing the HMAC key 124. The master key encryption key 122, however, is retained at 916 and stored on the HSM 118.

The HMAC key cryptogram 126 is cryptographically protected with a reliable timestamp as a signed message using the private key of the HSM 118 prior to being transmitted from the HSM 118 to the database server 116 through the secure connection 150. As part of cryptographically protecting the HMAC key cryptogram 126 prior to it being transmitted through the secure connection 150 from the HSM 118 to the database server 116, the key manager circuit 114 directs the HSM 118 to encrypt the HMAC key cryptogram 126 using a suitable algorithm to generate the first item 960. In an example embodiment, the first item 960 is a digital message transmitted from the HSM 118 to the database server 116 through the secure connection 150. In addition to the cryptographically protected HMAC key cryptogram 126, the message contains a reliable timestamp. In some embodiments, the message is digitally signed by the HSM 118 using the HSM certificate and/or the HSM private key. When generating the digital signature, signcryption or another suitable method may be used.

As part of the DBEKSM process shown at 900, contemporaneously with process 906 or at some other point in time, at 952, the key manager circuit 114 generates, using volatile memory of the database server 116, an RSA key pair. The RSA key pair comprises an RSA public key and an RSA private key, both associated with the database server 116. At 954, the RSA public key is stored by the key manager circuit 114 in the RSA key vault 970 of the database server 116. The RSA private key resides only in the volatile memory of the database server 116 and is never written to disk. In some embodiments, the database server 116 can also submit a certificate signing request (CSR) to a certification authority (CA) to obtain a digital certificate, such a X.509 digital certificate. The database server 116 shares the RSA public key with the HSM 118 over the secure connection 150.

At 908, the interface circuit 112 provides the cryptographically protected HMAC key cryptogram 126 to the database server 116 via the secure connection 150. Prior to decrypting the HMAC key cryptogram 126, the key manager circuit 114 directs the database server 116 to verify and decrypt the first item 960 using the public key of the HSM 118 and/or to validate the certificate of the HSM 118, in order to extract the cryptographically protected HMAC key cryptogram 126 from the first item 960.

The database server 116 stores the extracted HMAC key cryptogram 126 in local storage 142. In embodiments where the database server 116 is part of an electronic device, such as a mobile device or an IoT device, the HMAC key cryptogram 126 is stored in permanent memory of the electronic device.

At 910, the database server 116 generates a unique identifier 128 as described herein in reference to FIG. 5. The purpose of the unique identifier 128 is to uniquely identify to the database server 116 to the HSM 118. In some embodiments, the unique identifier 128 comprises an ordered list of database server attributes. The database attributes may include database properties: for example, a host name, a geographic location indicator, a database server identifier, a database application name (e.g., in embodiments where a database application generates the unique identifier 128), a string identifying a database encryption algorithm used in the transaction, and/or a string identifying a data element in the database.

At 912, the database server 116 stores the unique identifier 128 in local storage 142 associated with the database server 116.

Processes 918-938 pertain to generating and cryptographically protecting the seed 132 for the DEK 130, which is used by the database server 116 to cryptographically protect the data processed by the database server 116.

To obtain a seed 132 for the DEK 130, the database server 116 sends a request to the HSM 118 over a secured channel, such as the secure connection 150. At 918, the database server 116 retrieves the HMAC key cryptogram 126 from the local storage 142. At 920, the database server 116 retrieves the unique identifier 128 from the local storage 142. These retrieved values are sent to the HSM 118 through the secure connection 150.

The HMAC key cryptogram 126 and the unique identifier 128 are cryptographically protected prior to being transmitted through the secure connection 150. To accomplish this, at 956, prior to transmitting the HMAC key cryptogram 126 and the unique identifier 128 from the database server 116 to the HSM 118, the key manager circuit 114 retrieves the RSA public key from the RSA key vault 970 and sends the RSA public key to the HSM 118 over the secure connection 150. The HMAC key cryptogram 126 and the unique identifier 128 are cryptographically protected using the RSA private key that resides (is written to) in the volatile memory of the database server 116 to generate the second item 962. In an example embodiment, the second item 962 is a digital message transmitted from the database server 116 to the HSM 118 through the secure connection 150. In addition to the cryptographically protected HMAC key cryptogram 126 and the unique identifier 128, the message contains a timestamp. In some embodiments, the message is digitally signed by the database server 116 using the RSA private key that resides in the volatile memory of the database server 116. When generating the digital signature, signcryption or another suitable method may be used.

At 922, the HMAC key cryptogram 126 is decrypted by the key manager circuit 114 using the master key encryption key 122 to obtain the HMAC key 124. Prior to decrypting the HMAC key cryptogram 126, the key manager circuit 114 directs the HSM 118 to verify and decrypt the second item 962 using the RSA public key in order to extract the HMAC key cryptogram 126 and the unique identifier 128 from the second item 962. In some embodiments, the key manager circuit 114 directs the HSM 118 to validate the certificate associated with the database server 116.

At 924, a seed 132 is generated by the key manager circuit 114 using the HMAC key 124 and the unique identifier 128. The seed 132 is generated by calling an HMAC function, the executable file for which may be, for example, installed on the HSM 118, and transmitted to the database server 116 through the secure connection 150. The purpose of the seed 132 is to securely generate a secret value that serves as an input to a key derivation function (KDF) executed on the database server 116 to generate the DEK 130. Advantageously, at 928 and 930, respectively, the HMAC key 124 and the unique identifier 128 are deleted from the HSM 118 to reduce security vulnerabilities.

At 928, the seed 132 is cryptographically protected using the RSA public key, previously shared by the database server 116 with the HSM 118, to generate the third item 964. In an example embodiment, the third item 964 is a digital message transmitted from the HSM 118 to the database server 116 through the secure connection 150. In addition to the cryptographically protected seed 132, the message contains a timestamp. In some embodiments, the message is digitally signed by the HSM 118 using the HSM private key associated with the HSM 118. When generating the digital signature, signcryption or another suitable method may be used. In some embodiments, the HSM 118 may encrypt the seed 132 using a content encryption key (CEK) via a key establishment method defined, for example, in the X9.73 CMS standard.

The third item 964 is transmitted by the key manager circuit 114 from the HSM 118 to the database server 116, where, at 958, the key manager circuit 114 directs the database server 116 to verify and decrypt the second item 962 in order to extract the seed 132. In some embodiments, the database server 116 verifies the HSM certificate associated with the HSM 118.

Subsequently, at 926, the database server 116 derives the DEK 130 using the seed 132 as an input to a KDF. According to various embodiments, the algorithm for the KDF is based on, for example, NIST SP 800-108, ISO/IEC 11770-6, or another suitable standard. At 932, the DEK 130 is installed on the database server 116. At 934 and 936, respectively, the data processed on the database server 116 is encrypted and decrypted using the DEK 130. Advantageously, the DEK 130 is not stored in local storage 142 associated with the database server 116.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method for managing database encryption keys without transmitting cleartext keys, comprising:
generating, by a hardware security module (HSM) key manager circuit of a database encryption key management system associated with an HSM, a master key encryption key for the HSM;
generating, by the HSM key manager circuit, a hash-based message authentication code (HMAC) key;
encrypting, by the HSM key manager circuit, the HMAC key using the master key encryption key to generate an HMAC key cryptogram;
creating, by the HSM key manager circuit, a secure connection between the HSM and the database server;
transmitting, by an HSM interface circuit, the HMAC key cryptogram to a database server via the secure connection;
directing, by the HSM key manager circuit, the database server to store the HMAC key cryptogram to a disk associated with a non-volatile memory for the database server;
destroying, by the HSM key manager circuit, the HMAC key and the HMAC key cryptogram from a storage media associated with the HSM;
receiving, by the HSM interface circuit from the database server, the HMAC key cryptogram and a unique identifier generated by the database server and provided through the secure connection;

decrypting, by the HSM key manager circuit, the HMAC key cryptogram to obtain the HMAC key;

generating, by the HSM key manager circuit, a seed using the HMAC key and the unique identifier;

deleting, by the HSM key manager circuit, the unique identifier from the local storage media associated with the HSM; and transmitting, by the HSM key manager circuit, the seed from the HSM to the database server;

wherein the database server derives a database encryption key (DEK) using the seed as an input to a key derivation algorithm (KDF).

2. The method of claim 1, wherein the DEK resides only in the volatile memory on the database server.

3. The method of claim 1, wherein the master key encryption key resides only within the HSM.

4. The method of claim 1, wherein the KDF is known only to the database server and not to the HSM.

5. The method of claim 1, wherein the secure connection with the database server is established using at least one of a Transport Layer Security protocol, an Internet Protocol Security protocol, or a mutual authentication algorithm comprising digital certificates.

6. The method of claim 1, further comprising encrypting the seed using asymmetric encryption such that the seed transmitted to the database server is the asymmetrically encrypted seed.

7. The method of claim 6, wherein the seed is encrypted using a server public key of a server key pair generated by the server, the server key pair including the server public key and a server private key.

8. The method of claim 6, further comprising:

receiving, by the HSM interface circuit, the server public key from the database server; and generating, by the HSM key manager circuit, a database encryption secure key management (DBESKM) message, the DBESKM message comprising each of the encrypted seed and a timestamp digitally signed using an HSM private key of an HSM key pair generated by the HSM, the HSM key pair including the HSM private key and an HSM public key, wherein the seed is transmitted to the database server via the DBESKM message.

9. The method of claim 8, wherein the DBESKM message is verified by the database server before the seed is used to derive the DEK.

10. The method of claim 8, wherein the seed is further cryptographically protected using a content encryption key (CEK).

11. The method of claim 1, wherein the unique identifier is a first unique identifier and the DEK is a first DEK, the method further comprising:

receiving, by the HSM interface circuit from the database server, the HMAC key cryptogram and a second unique identifier, the second unique identifier generated by the database server;

decrypting, by the HSM key manager circuit, the HMAC key cryptogram to obtain the HMAC key;

generating, by the HSM key manager circuit, a second seed using the HMAC key and the second unique identifier; and transmitting, by the HSM key manager circuit, the second seed to the database server;

wherein a database server key manager circuit derives a second DEK using the second seed as an input to the KDF; and wherein the second DEK resides in volatile memory on the database server.

12. The method of claim 11, further comprising replacing the first DEK with the second DEK on the database server.

13. The method of claim 11, wherein the seed is a first seed is associated with a first database group and the second seed is associated with a second database group;

wherein the second seed is generated using a second HMAC key;

wherein the first seed corresponds to the first DEK unknown to the HSM and unknown to the second database group; and wherein the second seed corresponds to the second DEK unknown to the HSM and unknown to the first database group.

14. The method of claim 13, wherein the second HMAC key is generated by the HSM key manager circuit using the master key encryption key used to generate the first HMAC key.

15. The method of claim 13, wherein the second HMAC key is generated by the HSM key manager circuit using a second master key encryption key different from the first master key encryption key and unknown to the first database group.

16. The method of claim 1, wherein the database server is identified at least in part by the HSM key manager circuit to the HSM using an object identifier unique to the database server's association with the HSM.

17. The method of claim 16, wherein the object identifier comprises an ordered list of database properties.

18. The method of claim 1, wherein the database server resides at least in part on a mobile device.

19. The method of claim 1, wherein the database server resides at least in part on an internet-of-things device.

20. The method of claim 1, wherein the database server resides at least in part on an automated teller machine.

21. The method of claim 1, wherein the HSM is a first HSM, the HSM key manager circuit is a first HSM key manager circuit, the database encryption key management system is a first database encryption key management system, the master key encryption key is a first master key encryption key, the HMAC key is a first HMAC key, the HMAC key cryptogram is a first HMAC key cryptogram, the HSM interface circuit is a first HSM interface circuit, the storage media is a first storage media, the unique identifier is a first unique identifier, the seed is a first seed, and the DEK is a first DEK, the method further comprising:

generating, by a second HSM key manager circuit of a second database encryption key management system associated with a second hardware security module (HSM), a second master key encryption key for the second HSM;

generating, by the second HSM key manager circuit, a second HMAC key;

encrypting, by the second HSM key manager circuit, the second HMAC key using the second master key encryption key to generate a second HMAC key cryptogram;

transmitting, by a second HSM interface circuit, the second HMAC key cryptogram to the database server;

destroying, by the second HSM key manager circuit, the second HMAC key and the second HMAC key cryptogram from a second storage media associated with the second HSM;

storing, by the database server, the second HMAC key cryptogram;

receiving, by the second HSM interface circuit from the database server, the second HMAC key cryptogram and a second unique identifier generated by the database server;

decrypting, by the second HSM key manager circuit, the second HMAC key cryptogram to obtain the second HMAC key;

generating, by the second HSM key manager circuit, a second seed using the second HMAC key and the second unique identifier;

deleting, by the second HSM key manager circuit, the second unique identifier from the second local storage media associated with the second HSM; and transmitting, by the second HSM key manager circuit, the second seed from the second HSM to the database server;

wherein the database server derives a third database encryption key (DEK) using the second seed as an input to the key derivation algorithm (KDF).

22. A secure key exchange for electronic transactions (SKEET) computing system comprising:
a hardware security module (HSM);
an HSM key manager circuit;
an HSM interface circuit; and
a database encryption key management system associated with the HSM;
the SKEET computing system configured to:
generate, by the HSM key manager circuit of the database encryption key management system associated with the HSM, a master key encryption key for the HSM;
generate, by the HSM key manager circuit, a hash-based message authentication code (HMAC) key;
encrypt, by the HSM key manager circuit, the HMAC key using the master key encryption key to generate an HMAC key cryptogram;
create, by the HSM key manager circuit, a secure connection between the HSM and the database server;
transmit, by an HSM interface circuit, the HMAC key cryptogram to a database server via the secure connection;
direct, by the HSM key manager circuit, the database server to store the HMAC key cryptogram to a disk associated with a non-volatile memory for the database server;
destroy, by the HSM key manager circuit, the HMAC key and the HMAC key cryptogram from a storage media associated with the HSM;
receive, by the HSM interface circuit from the database server, the HMAC key cryptogram and a unique identifier generated by the database server and provided through the secure connection;
decrypt, by the HSM key manager circuit, the HMAC key cryptogram to obtain the HMAC key;
generate, by the HSM key manager circuit, a seed using the HMAC key and the unique identifier;
delete, by the HSM key manager circuit, the unique identifier from the local storage media associated with the HSM; and transmit, by the HSM key manager circuit, the seed from the HSM to the database server;
the database server deriving a database encryption key (DEK) using the seed as an input to a key derivation algorithm (KDF).

23. The computing system of claim 22, the DEK residing only in the volatile memory on the database server.

24. The computing system of claim 22, the master key encryption key residing only within the HSM.

25. The computing system of claim 22, the KDF being known only to the database server and not to the HSM.

26. The computing system of claim 22, the secure connection with the database server being established using at least one of a Transport Layer Security protocol, an Internet Protocol Security protocol, or a mutual authentication algorithm comprising digital certificates.

27. The computing system of claim 22, further configured to encrypt the seed using asymmetric encryption such that the seed transmitted to the database server is the asymmetrically encrypted seed.

28. The computing system of claim 27, the seed being encrypted using a server public key of a server key pair generated by the server, the server key pair including the server public key and a server private key.

29. The computing system of claim 27, further configured to:
receive, by the HSM interface circuit, the server public key from the database server; and
generate, by the HSM key manager circuit, a database encryption secure key management (DBESKM) message, the DBESKM message comprising each of the encrypted seed and a timestamp digitally signed using an HSM private key of an HSM key pair generated by the HSM, the HSM key pair including the HSM private key and an HSM public key,
the seed being transmitted to the database server via the DBESKM message.

30. The computing system of claim 29, the DBESKM message being verified by the database server before the seed is used to derive the DEK.

31. The computing system of claim 29, the seed being further cryptographically protected using a content encryption key (CEK).

32. The computing system of claim 22, the unique identifier being a first unique identifier and the DEK being a first DEK, the computing system further configured to:
receive, by the HSM interface circuit from the database server, the HMAC key cryptogram and a second unique identifier, the second unique identifier generated by the database server;
decrypt, by the HSM key manager circuit, the HMAC key cryptogram to obtain the HMAC key;
generate, by the HSM key manager circuit, a second seed using the HMAC key and the second unique identifier; and
transmit, by the HSM key manager circuit, the second seed to the database server;
a database server key manager circuit deriving a second DEK using the second seed as an input to the KDF; the second DEK residing in volatile memory on the database server.

33. The computing system of claim 32, further configured to replace the first DEK with the second DEK on the database server.

34. The computing system of claim 32, the seed being a first seed associated with a first database group and the second seed being associated with a second database group;

the second seed being generated using a second HMAC key;

the first seed corresponding to the first DEK unknown to the HSM and unknown to the second database group; and the second seed corresponding to the second DEK unknown to the HSM and unknown to the first database group.

35. The computing system of claim 34, the second HMAC key being generated by the HSM key manager circuit using the master key encryption key used to generate the first HMAC key.

36. The computing system of claim 34, the second HMAC key being generated by the HSM key manager circuit using a second master key encryption key different from the first master key encryption key and unknown to the first database group.

37. The computing system of claim 22, the database server being identified at least in part by the HSM key manager circuit to the HSM using an object identifier unique to the database server's association with the HSM.

38. The computing system of claim 37, the object identifier comprising an ordered list of database properties.

39. The computing system of claim 22, the database server residing at least in part on a mobile device.

40. The computing system of claim 22, the database server residing at least in part on an internet-of-things device.

41. The computing system of claim 22, the database server residing at least in part on an automated teller machine.

42. The computing system of claim 22, the HSM being a first HSM, the HSM key manager circuit being a first HSM key manager circuit, the database encryption key management system being a first database encryption key management system, the master key encryption key being a first master key encryption key, the HMAC key being a first HMAC key, the HMAC key cryptogram being a first HMAC key cryptogram, the HSM interface circuit being a first HSM interface circuit, the storage media being a first storage media, the unique identifier being a first unique identifier, the seed being a first seed, and the DEK being a first DEK, the SKEET computing system further configured to:

generate, by a second HSM key manager circuit of a second database encryption key management system associated with a second hardware security module (HSM), a second master key encryption key for the second HSM;

generate, by the second HSM key manager circuit, a second HMAC key;

encrypt, by the second HSM key manager circuit, the second HMAC key using the second master key encryption key to generate a second HMAC key cryptogram;

transmit, by a second HSM interface circuit, the second HMAC key cryptogram to the database server;

destroy, by the second HSM key manager circuit, the second HMAC key and the second HMAC key cryptogram from a second storage media associated with the second HSM;

store, by the database server, the second HMAC key cryptogram;

receive, by the second HSM interface circuit from the database server, the second HMAC key cryptogram and a second unique identifier generated by the database server;

decrypt, by the second HSM key manager circuit, the second HMAC key cryptogram to obtain the second HMAC key;

generate, by the second HSM key manager circuit, a second seed using the second HMAC key and the second unique identifier;

delete, by the second HSM key manager circuit, the second unique identifier from the second local storage media associated with the second HSM; and transmit, by the second HSM key manager circuit, the second seed from the second HSM to the database server;

the database server deriving a third database encryption key (DEK) using the second seed as an input to the key derivation algorithm (KDF).

* * * * *